UNITED STATES PATENT OFFICE.

FARLEY GRANGER CLARK AND ALEXANDER THOMAS STUART, OF TORONTO, ONTARIO, CANADA, ASSIGNORS TO THE TORONTO POWER COMPANY LIMITED, OF TORONTO, ONTARIO, CANADA, A CORPORATION OF ONTARIO.

PROCESS FOR CHEMICALLY EXTRACTING PURE METALS FROM THEIR ORES AT A TEMPERATURE LOWER THAN THE FUSING-POINT OF THE METALS TO BE EXTRACTED.

1,269,054.          Specification of Letters Patent.      Patented June 11, 1918.

No Drawing.        Application filed July 5, 1917. Serial No. 178,635.

*To all whom it may concern:*

Be it known that we, FARLEY GRANGER CLARK, a citizen of the United States of America, and ALEXANDER THOMAS STUART, a subject of the King of Great Britain, both residing at the city of Toronto, in the county of York and Province of Ontario, Dominion of Canada, have invented certain new and useful improvements in processes for chemically extracting pure metals from their ores at a temperature lower than the fusing-point of the metals to be extracted; and we hereby declare that the following is a full, clear, and exact description of the same.

This invention relates to a process for chemically extracting, at a temperature lower than the fusing point of the metal to be extracted, pure metals from their ores by decomposition in the presence of a gaseous reagent, which will combine with certain constituent matter to be removed, including oxygen, sulfur, phosphorus, and manganese, the products of the combination being gaseous and passing away from the reaction zone under the conditions of the process, and the isolated metal and the gangue matter which may not be attacked by the gaseous reagent retaining their original solid phase, to be separated by subsequent treatment.

While dry hydrogen is preferable as the reagent, as this gas does not add impurities to the ore or metal under treatment, and readily combines with certain substances, to be removed to form gases which, as a result of the recombination, pass away from the reaction zone, together with the excess free hydrogen, the amount of which is determined by the conditions of the process, any other reagent having like properties, such as carbon monoxid, may be substituted for the hydrogen. As such gases contain no extraneous substances except those which can be readily removed, the excess free hydrogen contained in such gases is recoverable and reusable. This is of the utmost importance for economic reasons, as by the recovery and reuse of this excess free hydrogen, an amount of hydrogen approximating the theoretical minimum required for the reaction is all that is needed for the isolation of the metal.

Satisfactory results have been attained by passing a controllable current of dry hydrogen through a reaction zone countercurrent to the flow of ore, the rate of the reaction being limited only by the capacity to deliver the required heat to the flow of ore and hydrogen, and being practically instantaneous when the amounts of ore and hydrogen and heat input are correctly regulated.

The best results are obtained by the direct application of electrical heat in the reaction zone, or to the ore and hydrogen immediately before entering the same, or the similar indirect application of heat from fuel firing, either gaseous, liquid or solid, the degree of heat being preferably sufficient only for the decomposition of the compounds of the substances and their recombination with the hydrogen.

This is of the utmost advantage over processes carried on at temperatures at or above the fusion points of the contained metal or other ore constituent, as the ore, and often the reducing agent, contain impurities, such as ash, sulfur, carbon, phosphorus, manganese, magnesia, lime, alumina, silica, etc., the elemental constituents of which may enter into and alloy themselves with the metal and form an inferior product which must be submitted to a refining process for the production of high-grade metals.

Iron contained in iron ore, either in lump or pulverized form, may be isolated in a pure metallic state by passing the ore and hydrogen through a reaction zone at a temperature which may be as low as 400 degrees centigrade, the hydrogen being so caused to circulate, preferably countercurrent to the ore, that certain substances to be removed, such as oxygen, sulfur, phosphorus and manganese, combine with the hydrogen instantly when decomposition occurs, forming with the hydrogen, gaseous compounds which pass away from the reaction zone and leave the pure metal and the gangue matter in their original solid phases chemically isolated.

The hydrogen compounds, together with the excess free hydrogen, after passing from the reaction zone, are collected, such excess free hydrogen being readily separated from the hydrogen compounds by usual methods, and after such separation, returned to the reaction zone for further use, the amount of the excess free hydrogen being fixed by the equilibrium constant for the particular conditions of the reaction involved, and as this amount is necessarily considerable, its collection, separation and reuse is of the utmost importance for the economical working of the process.

The hydrogen compounds, being also of economic value, are recovered for use, as many of these compounds, such as phosphorus in its various forms, have relatively high market values, and often are worth more than the metal itself.

This process not only permits of the isolation of the metal from its ore, but it also permits of the economical extraction of pure metal from ores, regardless of their physical structure, and from ores carrying large amounts of undesirable substances, which ores could not otherwise be used, except at prohibitive cost, and it not only permits of the employment or use of a wider range of ores, but it also extracts the metal in a substantially pure state, and in the case of iron, free, or practically free, from impurities such as sulfur, phosphorus, manganese, silicon and carbon, and of a purity hitherto unknown, and at a temperature lower than the fusing point of the metal.

Having thus fully described the nature of our invention, what we claim as new and desire to secure by Letters Patent, is:—

1. A process for extracting pure metal from its ores and removing undesirable constituents therefrom, which consists of passing ore and a gaseous reagent in regulable quantities through a reaction zone at a temperature sufficient to cause the reaction, but below the fusing point of the metal, to effect the isolation of the contained metal in a pure state, the gaseous reagent combining with the removed substances as compounds of the gaseous reagent.

2. A process for extracting pure metal from its ores and removing oxygen, sulfur, phosphorus, and manganese therefrom, which consists of passing ore and a gaseous reagent in regulable quantities through a reaction zone at a temperature sufficient to cause the reaction, but below the fusing point of the metal, to effect the isolation of the contained metal in a pure state, the gaseous reagent combining with the oxygen, sulfur, phosphorus, and manganese as compounds thereof.

3. A process for extracting pure metal from its ores and removing oxygen, sulfur, phosphorus, and manganese therefrom, which consists of passing ore and a gaseous reagent in regulable quantities through a reaction zone at a temperature sufficient to cause the reaction, but below the fusing point of the metal, to effect the isolation of the contained metal in a pure state, the gaseous reagent combining with the oxygen, sulfur, phosphorus, and manganese as compounds thereof, and then recovering such compounds.

Toronto, June 14th, 1917.

FARLEY GRANGER CLARK.
ALEXANDER THOMAS STUART.

Signed in the presence of—
 CHARLES H. RICHES,
 WM. VOLKMANN.